Nov. 22, 1955 C. A. HISSERICH 2,724,817
ECHO RANGING SYSTEM
Filed Feb. 1, 1944 3 Sheets-Sheet 1
*Fig. 1*
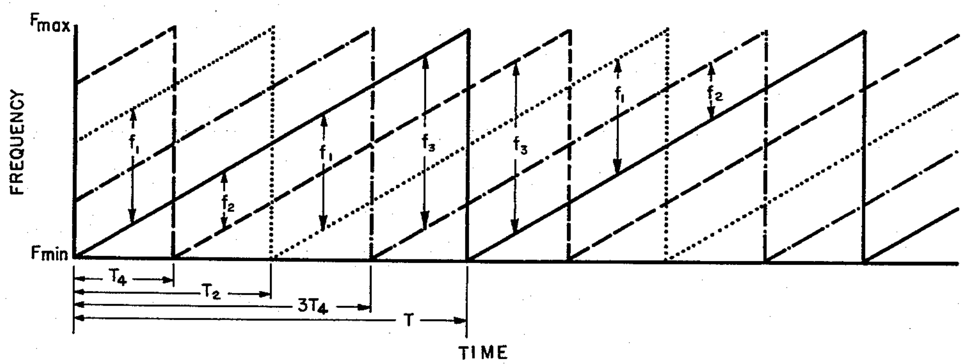
*Fig. 2*
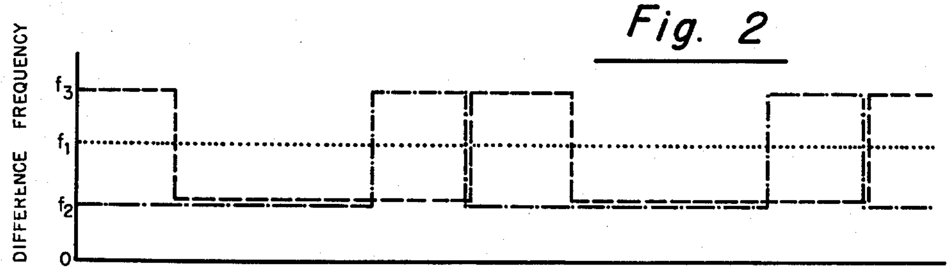
*Fig. 3*
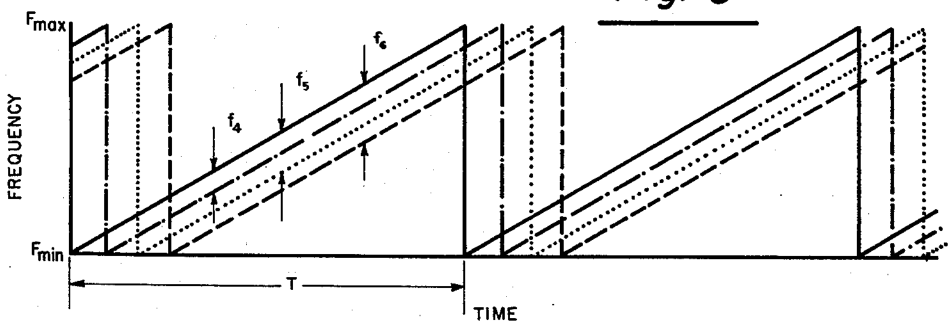
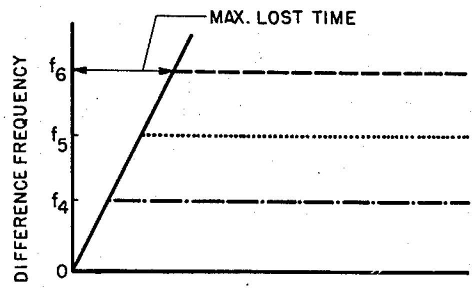
*Fig. 4*
INVENTOR.
CHARLES A. HISSERICH
BY George Sipkin
George E. Pearson
ATTORNEYS ECHO RANGING SYSTEM
Filed Feb. 1, 1944 3 Sheets-Sheet 2
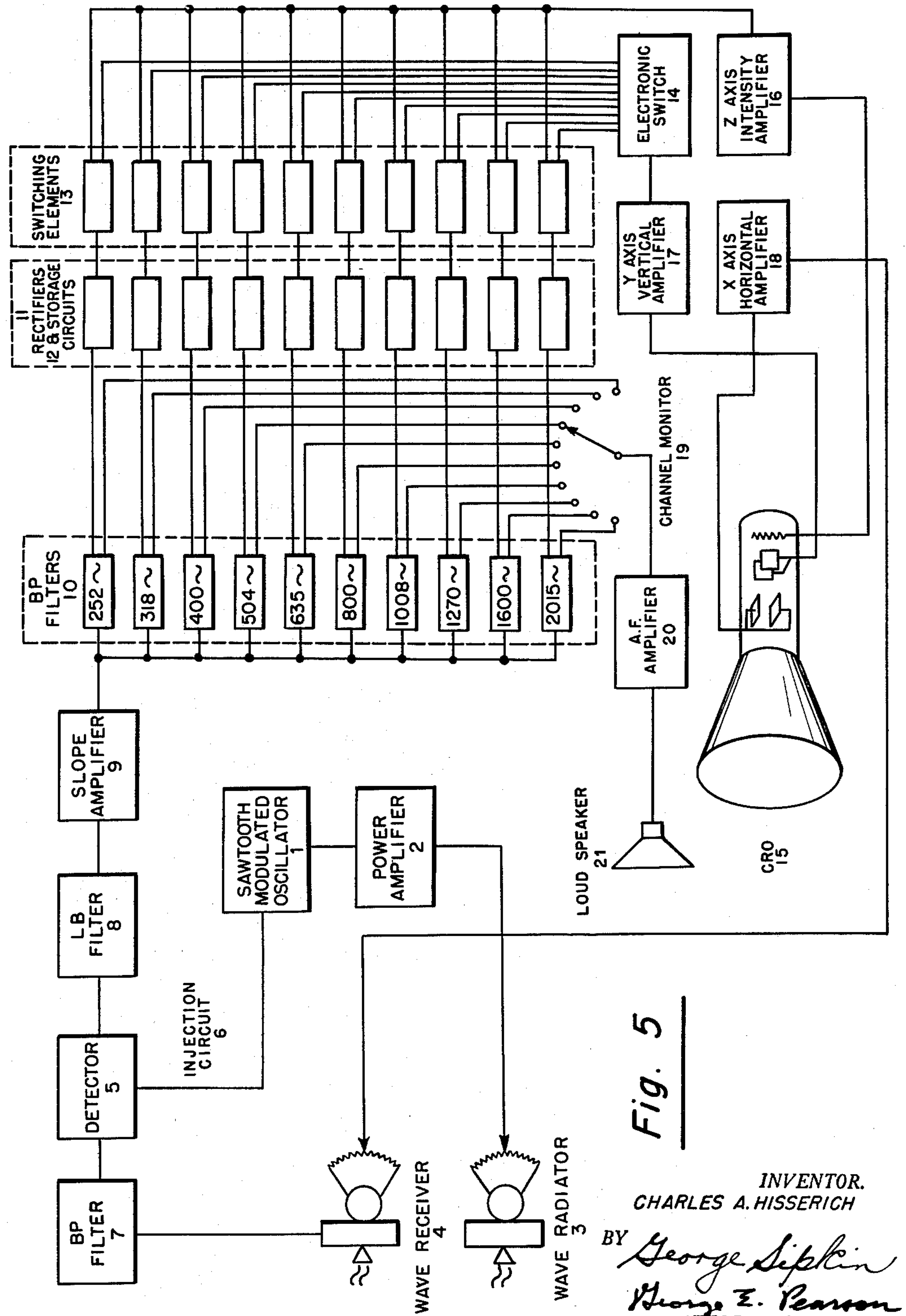

Nov. 22, 1955 C. A. HISSERICH 2,724,817
ECHO RANGING SYSTEM
Filed Feb. 1, 1944 3 Sheets-Sheet 3
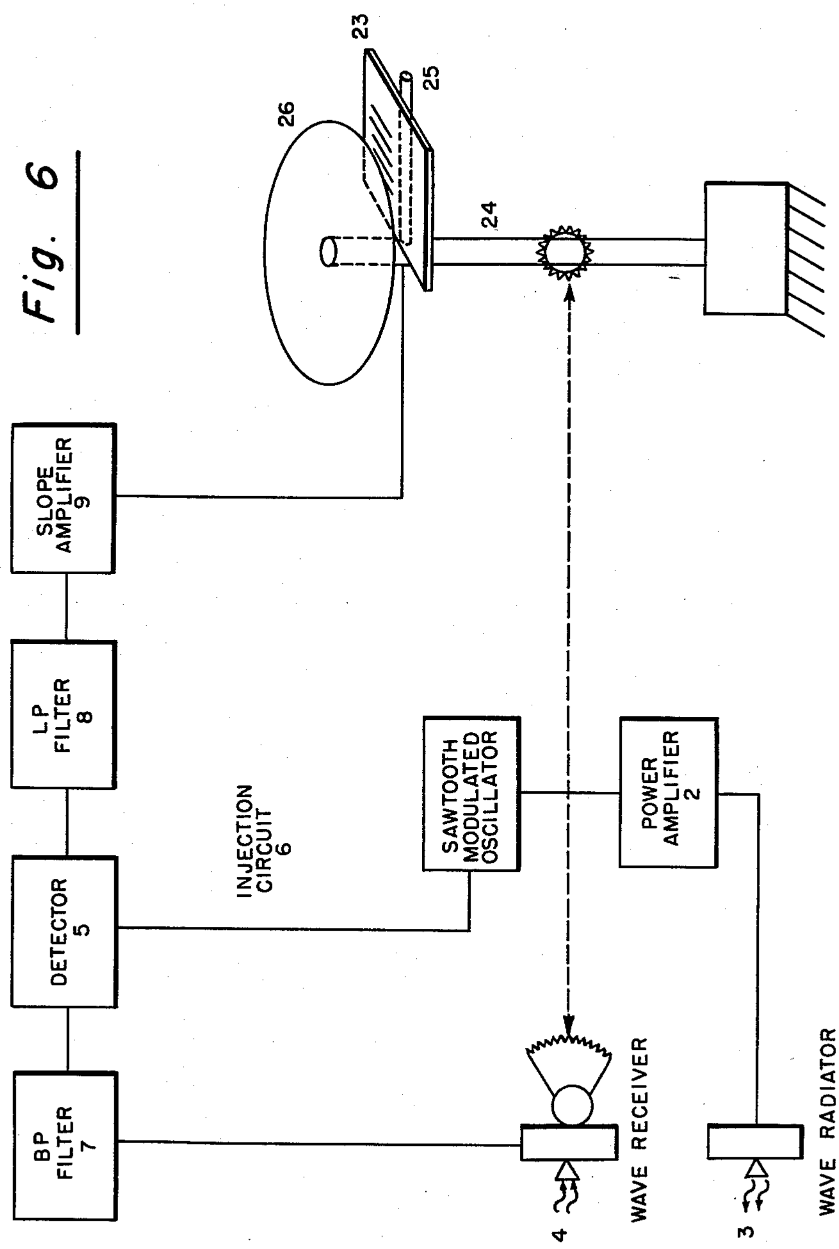
INVENTOR.
CHARLES A. HISSERICH
BY George Sipkin
George E. Pearson
ATTORNEYS

United States Patent Office 2,724,817

Patented Nov. 22, 1955

2,724,817

ECHO RANGING SYSTEM

Charles A. Hisserich, Hollywood, Calif., assignor to the United States of America as represented by the Secretary of the Navy Application February 1, 1944, Serial No. 520,667

8 Claims. (Cl. 340—3)

This invention relates to a system and method of echo ranging.

Most echo-ranging systems developed and used in the past have utilized means for introducing intermittent signals (or pings) into the acoustic medium. Such systems, however, have one serious defect—an inherently slow and discontinuous manner of operation. Under standard procedures with such (submarine) equipment, the search of a 180° sector to 5000 yards, with pings sent out every 5° in bearing, requires four minutes. Furthermore, there is present constantly the possibility that a target present in the scanned area may have been missed if a single pin is attenuated, masked or interrupted by any factor.

These difficulties were partially overcome in the system described in application for Letters Patent, Serial No. 488,501, filed May 26, 1943, by Karl S. Van Dyke and entitled Echo-Ranging System and Method, in which it is possible to focus the arrangement at a certain range for detection of objects at that particular distance, but the system does not allow the operator to determine the presence of objects at other ranges, without re-focusing the system.

However, in the system disclosed in the application referred to above, there is available at the output of the receiver, information which, if properly analyzed, will indicate the presence or absence of objects or targets at all ranges, simultaneously. Thus, it is one of the objects of the present invention to provide a system and method of echo ranging which will detect objects (if present) simultaneously at all ranges.

It is apparent that if a frequency-modulated (FM) wave is transmitted toward an object, the reflected wave may be heterodyned with the transmitted wave to produce a beat frequency. If the transmitted signal is modulated by a low-frequency linear sawtooth wave (either symmetrical or asymmetrical), it is also obvious that such a beat frequency is a measure of the range of the object from which the returning wave was reflected, as is shown in the above identified application. If several objects at varying distances from the projector reflect the transmitted wave, there will be produced a number of beat frequencies which are simultaneously present, from each of which the range of one particular object may be determined. It is, therefore, another object of the invention to analyze the output of such a receiver in order that the range of all objects be simultaneously and continuously determined.

Still another object is a means for analyzing the information in the receiver just described, so that the presence of the various beat frequencies may be separately, yet simultaneously, determined.

Yet another object of the invention is a device and method for obtaining and continuously portraying on a single screen, information about the presence of a plurality of objects located at varying distances and bearings from an echo-ranging projector.

An even further object of the invention is a method and system of echo ranging which provides accurate information about objects or targets in a large area in an exceedingly short time. In other systems which require "focusing" at a particular range and/or bearing, there is always a very considerable loss of time because information from only one point or range is available at any one time. Thus, in the intermittent signal systems, the transmitted signals must be spaced sufficiently in time that an echo is received from one signal before another is transmitted. Even in the continuous signal system described above, it is necessary to "re-focus" the transmitter and wait for the round-trip signal transit time before other ranges may be investigated. However, in the continuous signal system, there is available, in the receiver, information with respect to all ranges. In the present invention, this is separated and/or applied to a plurality of channels, with each channel carrying information about a particular range. The outputs of the various channels may either be examined simultaneously or rapidly scanned and presented on a long-persistence device for effectively simultaneous examination. In this manner, information with respect to all ranges and bearings (as well as changes in range and bearing) is continuously available.

In the drawings:

Figure 1 is a plot of frequency versus time showing the relation between transmitted and received waves.

Figure 2 is a plot of frequency versus time showing the heterodyne frequencies produced by the waves of Fig. 1.

Figure 3 is a plot of frequency versus time showing a desirable relation between transmitted and received waves, wherein the received waves are displaced only a small amount from the transmitted waves.

Figure 4 is a graph showing the amount of lost time for operation under the conditions illustrated in Fig. 3.

Figure 5 is a schematic block diagram of one form of the invention.

Figure 6 is a schematic block diagram of another form of the invention.

In the present invention, a linear sawtooth FM signal is radiated into the water continuously. This continuous signal may have either a symmetric (roof-top) or asymmetric sawtooth wave shape. The echoes or reflected waves which return to the receiver after reflection from an object are characterized by a wave of the same shape displaced in phase from the transmitted wave by an amount proportional to the time of travel to and from the object. At any instant, therefore, the transmitted and reflected signals differ in frequency by an amount proportional to this time, or the distance to the object (since the velocity of the waves is constant). In the invention, the two waves are heterodyned together to produce their difference frequency. If several objects are present, each will reflect a wave which, when heterodyned with the transmitted signal, will produce a similar heterodyned frequency proportional to its range or distance from the radiator.

Thus, at the output of the detector there is a spectrum of frequencies that individually have a unique correspondence to the range of the object producing them. In the invention, this spectrum is analyzed and then separated, and individual frequencies utilized to operate a multichannel indicator. Consequently, information with respect to all ranges is continuously and simultaneously presented.

Since the presence of an object at a particular range is characterized by the production of a particular heterodyne signal, it is seen that unless the reflected wave arrives at the receiver at a time (after transmission) exactly equal to one-half of the sawtooth period as shown in Fig. 1, this signal will be characterized by an alternating step-frequency tone (as illustrated in Fig. 2). For example, if the transmitted wave (indicated by the full line in Fig. 1) is assumed to vary between $F_{max}$ and $F_{min}$ and the sawtooth period is T, a continuous constant frequency $f_1$ will be produced by heterodyning the received wave (indicated by a dotted line) with the transmitted wave, only when the received wave arrives at the receiver at a time T/2 after transmission. If the received wave arrives at some other time after transmission, say T/4 seconds later (as indicated by the dashed line), the heterodyne frequency will be one which will step from $f_2$ (over 3/4 of the sawtooth cycle) to $f_3$ (over 1/4 of the sawtooth cycle). This same variation will be produced by a received wave which arrives (as indicated by the dot-dash line) at a time 3T/4 seconds after transmission, or from an object which is positioned three times as far away from the radiator.

These heterodyne or difference frequencies are illustrated in Fig. 2, whose graphs correspond to the reflected waves shown in Fig. 1. Thus, the heterodyne waves are identical (except for phase) when echoes return at T/4 and 3T/4 seconds after transmission. In a similar manner, it can be shown that every returning wave (except one returning at T/2 seconds after transmission) has such an "image" wave, which may be confused with it.

Thus, before describing means and methods of utilizing the various beat frequencies, the possibility of this confusion should be eliminated. This may be accomplished in the invention by so choosing the sawtooth period T that the reflected waves from all of the ranges which are to be examined lie close to the transmitted frequencies, as shown in Fig. 3. If this is done, the so-called "image" frequencies may be easily eliminated by properly choosing the receiver pass band, and because waves may be considerably attenuated and refracted (or bent) at the long ranges responsible for the production of the "image" waves. However, when the sawtooth period is chosen to insure this type of operation, a certain percentage of lost time is introduced, as is illustrated in Fig. 4. Since the "image" frequencies are to be disregarded, that portion of the sawtooth in which they are present serves no useful purpose. The percent of lost time is illustrated by the solid line in Fig. 4, and is seen to be proportional to the range. It is found that if the greatest percentage, as illustrated in Fig. 4, is maintained below about 25% no undesirable effects will be produced. The lost time may be considered as simply a loss of resolution in the system (due to possible target movement during this lost time), but fortunately is smaller at the shorter ranges, at which more accurate information is desired.

Given the type of transmission which has been discussed above, and assuming sawtooth operation, the period of which is preferably chosen so that the reflected waves lie close to the transmitted wave, there are two methods of resolving the information contained in the receiver. The first, illustrated in Fig. 5, is electrical; and the second, illustrated in Fig. 6, is mechanical.

The electrical method comprises feeding the output of the receiver to a series of band-pass filters, each of which is designed to pass a particular band of difference frequencies, which correspond to echoes returning from objects in a narrow range band. Each filter is tuned to one of a sequence of frequencies so that together they cover the entire spectrum to be analyzed. Provision is made for rectifying the output of each filter channel and the resulting D. C. is used to charge a condenser so that the signal may be properly stored and averaged. This results in making continuously available at the output of each channel, information regarding the presence of objects or targets at the range represented by that channel. The stored energy, in turn, may be connected, by means of a switch, to a cathode-ray oscilloscope (CRO) in a manner that each channel is successively applied, through an amplifier, to modulate the intensity of the spot. If the spot is made to scan synchronously with the application of successive channels to the intensity circuit (by means of the switch), it is seen that a plot of range may be set off on the CRO screen and the presence of targets determined by the brightening of the spot. If a long-persistence screen-type CRO is used, excellent plots are obtained for all ranges.

Although any conventional type of switching scheme may be used, it has been found that the Electronic Switch, disclosed in a patent application, executed February 2, 1943, by Sidney Bertram and entitled Multi-Channel Electronic Switch, Serial No. 532,915, and filed April 26, 1944, now Patent No. 2,594,535 issued April 29, 1952, will give excellent results. It provides a means of rapidly scanning the outputs of the filter channels so that the information may be portrayed on the screen of a CRO.

The system of Fig. 5 is one which has proved very successful in submarine echo ranging and is described here simply as an example of the invention. The sawtooth-modulated oscillator 1 (which may consist of a positive bias multivibrator modulated by the D. C. sawtooth from a relaxation oscillator), power amplifier 2, wave projector or radiator 3, wave receiver 4, detector 5 and the injection circuit 6 are conventional and may be the same as those disclosed in the patent application, Serial No. 488,501, filed May 24, 1943 referred to above. A band-pass filter 7 is connected between the wave receiver 4 and detector 5 in order to limit the frequencies passed to the receiving system to about the range of those transmitted. It has been found that provision of such a filter notably improves the ultimate signal-to-noise ratio. The signal from filter 7 is mixed with the heterodyne injection voltage from the sawtooth-modulated oscillator 1 in detector 5, which conveniently may be a copper oxide varistor operating as a ring modulator. The detector 5 is followed by another low-pass filter 8 passing only those heterodyne frequencies which correspond to the ranges to be scanned, and thus eliminating the "image" frequencies which are produced by exceedingly long ranges as described above. For example, if the sawtooth-modulated oscillator is arranged to sweep from 36 to 48 kc., its range may be chosen at approximately 0 to 3000 cycles. The output of filter 8 is applied to a slope amplifier 9. This amplifier is one of conventional design and is used to compensate for the effects produced by the phenomenon known as reverberation. This is because the intensity of reverberation drops rapidly after transmission (with increasing range), and it is thus necessary to amplify the higher frequencies to a much greater degree than the lower frequencies. The slope of such amplification is chosen such that the intensity of reverberation is maintained approximately the same for all frequencies (i. e., ranges). The rate of gain increase should theoretically be 12 db per octave, corresponding to the inverse fourth power law. This function may also be accomplished in the individual filter channels (to be described) but it is more convenient to do it as just described so that all the filters work at approximately the same level. In any case, the possibility of false indications due to local reverberation is largely eliminated by either of these means.

The output of amplifier 9 is supplied to a multi-channel filter 10, whose separate channels are conventionally arranged to pass successive bands of frequencies. For example, if the sawtooth-modulated oscillator 1 is assumed to sweep between 36 and 48 kc. and it is desired to scan ranges from approximately 180 to 1800 yards, it has been found convenient to choose filter 10 with ten channels whose band-pass components are approximately 1/3 octave wide and center about the frequency values shown in Fig. 5, with transitions occurring at the 3 *db* attenuation points.

One difficulty which is seemingly apparent in connection with the filter 10 is that the range resolution might be poor because range is scanned in zones. However, the range resolution is found to be considerably better than the zonal distribution would indicate because the filters are chosen with slopes which overlap. This enables a single frequency to present reduced amplitude indication in adjacent channels, but the relative distribution of these adjacent channel signals gives an indication of true placement in the center channel, as viewed on the CRO, to be subsequently described.

In connection with the filter 10, it should be noted that it may be of any conventional type and that the one described is illustrative only. Thus, any number of channels may be used, other pass-bands (to represent other ranges) may be chosen, or the sawtooth period of the oscillator 1 may be made adjustable, in which case the ranges represented by the filter channels are all proportionately changed. For example, in the case above, a sawtooth period of 12 seconds has been used to cover a range of from approximately 180 to 1800 yards. Any increase or decrease in the sawtooth period causes a proportional change in the ranges scanned.

The output of each of the channels of filter 10 is applied to a rectifier 11, and in turn to a storage circuit 12. Conventional arrangements of condensers shunted with resistors may be utilized for this purpose and the time constant for both build-up and decay should be approximately equal to the time spent by the receiving beam as it scans over a target point. This arrangement, equivalent in action to a low-pass filter, improves the ratio of signal to noise since very short pulses of noise do not have sufficient time to build up an interferring signal.

As has been described above, any conventional type switch may be used to connect the successive storage circuits to the indicator. In Fig. 5, individual switching elements 13 are illustrated, which are a part of the electronic switch 14. This whole switch arrangement may conveniently be identical with that described in a patent application, executed February 2, 1943, by Sidney Bertram and entitled Multi-Channel Electronic Switch, Serial No. 532,915, filed April 26, 1944.

The outputs of the storage circuits 12 are connected or scanned, in succession (at a rate depending upon the operation of switch 14), and applied to the cathode-ray oscilloscope 15 (preferably of the long-persistence screen type), through the Z-axis, or intensity amplifier 16. In this way the storage circuits cause a brightening of the spout on the CRO screen at the appropriate time in the sweep. In order that the screen of the CRO will have a long life, it is desirable to make the intensity amplifier 16 a limiting amplifier. Thus, loud or intense signals do not irreparably damage the CRO screen.

The Y-axis, or vertical amplifier 17 is controlled by the scanning voltage of switch 14 in order that the output from any one channel causes a brightening of the spot at the same point during each sweep. This deflection can be made to follow any time law depending upon the kind and rate of scan and the kind of range scale desired on the CRO screen.

The X-axis, or horizontal amplifier 18, is arranged to operate in conjunction with the movement of the wave receiver 4, so that an azimuth or bearing angle scale may be established on the CRO screen. This arrangement is also conventional and any convenient means to insure the synchronization of the horizontal sweep of the CRO spot with the sweep of the receiver may be used.

It has also been found convenient in the circuit illustrated in Fig. 5 to provide a channel monitor switch 19 which is connected through an audio-frequency amplifier 20 to a loudspeaker 21. By means of this system, the output of amplifier 9 or any one of the channels of filter 10 may be listened to directly, if desired.

Returning to the wave receiver sweep arrangement, it may be said that the particular one chosen depends upon the use to be made of the gear. It may be advantageous to have the receiver automatically sweep back and forth over a given sector, as where the gear is mounted on shore or on a stationary ship for guarding a harbor entrance. The same arrangement also is very satisfactory for use on the bow of a ship for detecting submerged objects, such as submarines, rocks, wrecks, mines, etc.

In other cases, as for instance on an anti-submarine vessel, it may prove desirable to have a 360° sweep on the device so that the surrounding area is under complete investigation at all times. In another application, the sweep may be arranged to be manual, as is true of conventional gear, and trainable by an operator. Or, these methods may be combined in the same gear so that any particular sweep arrangement may be utilized.

It may also be desirable to arrange the plot on the CRO screen in polar rather than Cartesian coordinates in order that more accurate estimation of ranges and bearings may be made. To accomplish this, the orientation of the CRO trace may be determined by means of a selsyn system in which a driving selsyn is connected to the shaft by means of which the wave receiver is rotated and the driven selsyn is connected to mechanically rotate the magnetic deflection coils in the CRO. This system provides, in essence, a polar plot of the area being scanned. When a spot appears upon the screen, its distance from the center is a reliable measure of its range. Its azimuth is its relative bearing. Its size and shape provide information for determining its nature and its proportions Other methods of plotting, known to those in the art, may also be utilized.

It is clear from the foregoing that the particular kind of receiver sweep and plotted indication is not of great importance and that the choice of any particular one is dependent upon the functions desired to be performed. The invention consists in the means and method of obtaining and indicating, simultaneously and continuously, the information from all ranges, and any convenient method of portrayal may be used. Nevertheless, the type and rate of scanning which is used has a determining effect upon other portions of the circuit. In other words, since the sawtooth rate determines the rate at which range is scanned and since in combination with the receiver sweep, this determines the area scanned, it is obvious that these rates must be chosen such that all points within the area are scanned and that the rate is not too fast for resolution of the information which is present. In this same connection the storage circuits and the switch scanning rate must be so arranged that proper resolution is obtained.

This may perhaps best be illustrated by giving an example of a system (partially described above) which has proven very satisfactory in practice. The sawtooth period T was taken at 12 seconds and a ten-channel switch was used with bands similar to those shown in Fig. 5. The scanning rate of the switch was taken at 120 times a second. In this case the wave receiver, having a beam pattern approximately 10° wide, was rotated to scan a sector 40° wide in 1 second. Thus a ¼-second averaging period was maintained. The time constants of the storage circuit were chosen at 1/20 second, which was comparatively large for the 1/120-second switch scan period, but was so chosen in order that the D. C. output indication approached the peak value as closely as possible. The choice of time constants (which affects the rate of response of this system) must necessarily be a compromise because a large time constant will broaden the azimuthal response and degrade the azimuthal resolution.

In the introduction to the system just described, it was stated that a slope-amplifier 9 was used to compensate for the variation in the intensity of reverberation. It is now clear that the purpose of this device was to insure a uniform threshold for all channels as they appear on the CRO screen and that reverberation would not appear as a target. This may be done by any convenient means, such as a gain control in each channel of the filter set as high as local reverberation and background noise in that channel will permit. Any signal in excess of such reverberation or noise thus exceeds the established threshold and a spot appears on the CRO screen.

As has already been indicated herein, it is not necessary to use the electronic method of Fig. 5 to obtain the desired continuous indication of ranges and bearings. A mechanical method, one form of which is illustrated in Fig. 6, has also been found very useful.

In this form of the invention, filter 10, rectifiers 11, storage circuits 12, switching elements 13, switch 14 and the CRO 15 (together with its associated circuits) are eliminated and replaced by a plurality of mechanically resonant elements, such as galvanometer suspensions and coils, tuned reeds or strings in a multi-string light valve (with each string tuned to a particular resonant frequency). The sawtooth-modulated oscillator 1, power amplifier 2, wave radiator 3, wave receiver 4, detector 5, injection circuit 6, filters 7, 8 and slope amplifier 9 are the same in Fig. 6 as in Fig. 5.

In brief, such a mechanical device is transformed into an indicator by arranging the plurality of resonant elements side by side, with each unit tuned to a slightly different frequency in a manner similar to the band-pass filter 10. Vibration of one or more of the elements provides indication that particular frequencies are present in the output of the detector 5, which frequencies indicate the presence of targets at corresponding ranges.

Figure 6 is a block schematic diagram of such a mechanical system in which a multi-string light valve is used. The valve 23, containing a row of tuned strings, is mounted for rotation on a shaft 24. A light source 25 is mounted at one side of and for rotation with the valve so that when any of the strings vibrate, light from the source 25 shines through the valve onto a stationary screen 26 (which is preferably of the long-persistence type of the kind used in cathode-ray oscilloscopes) mounted on the opposite side of the valve. For best operation, conventional mechanical means, indicated in Fig. 6 by the dotted line, are used to synchronize the rotation of the shaft 24 and valve 23 with the rotation of the wave receiver 4.

The output of the slope amplifier 9 is applied to the valve, and the vibration of the tuned strings, which corresponds to particular ranges as do the channels of filter 10, provides an indication of the frequencies present from which the presence of objects or targets at corresponding ranges may be determined. As is obvious, when the strings vibrate, the light from source 25 passes through the valve 23 and falls on the screen 26. The screen thus provides a 360° plan of the surrounding area and the range and bearing of an object is accurately located upon it by passage of light through the valve. As is true of the arrangement shown in Fig. 5, any type of azimuthal scanning procedure may be used.

Having described my invention, I claim:

1. An echo-ranging system comprising: means for generating a high-frequency electric signal; means for frequency-modulating said signal with a low-frequency linear wave; a sound energy projector driven by such modulated signal; a receiver mounted to receive sound energy emitted by said projector after reflection from an object; heterodyning means for heterodyning the signal driving said projector with the output signal of said receiver; amplifier means having a gain increasing with frequency connected to said heterodyning means; and frequency indicating means connected to said last-mentioned means, comprising a plurality of elements, each sensitive to only one of a plurality of different narrow bands of frequencies for indicating the frequency of the heterodyned signals, and means coupled to said frequency sensitive elements for determining the range of said object from the frequency of the heterodyned signal indicated by said frequency sensitive elements.

2. In the system described in claim 1, said bands being arranged in a series.

3. An echo-ranging system comprising: means for generating a high-frequency electric signal; means for frequency-modulating said signal with a low-frequency linear wave; a sound energy projector driven by such modulated signal; a receiver mounted to receive sound energy emitted by said projector after reflection from an object; heterodyning means for heterodyning the signal driving said projector with the output signal of said receiver; amplifier means having a gain increasing with frequency connected to said heterodyning means; a plurality of filters, connected to said last-mentioned means, each sensitive to a relatively narrow band of frequencies for indicating the frequency of the heterodyned signals; and means for successively examining the output of said filters for determining the range of the said object from the frequency indicated by said filters.

4. An echo-ranging system comprising: means for generating a high-frequency electric signal; means for frequency-modulating said signal with a low-frequency linear wave; a sound energy projector driven by such modulated signal; a receiver mounted to receive sound energy emitted by said projector after reflection from an object; heterodyning means for heterodyning the signal driving said projector with the output signal of said receiver; an amplifier having a gain increasing with frequency connected to said heterodyning means; a plurality of filters, connected to said last-mentioned means, each sensitive to a relatively narrow band of frequencies for indicating the frequency of the heterodyned signals; and means for successively applying the outputs of said filters to an indicator to determine the range of various targets from the frequency indicated by said filters.

5. An echo-ranging system comprising: means for generating a high-frequency electric signal; means for frequency-modulating said signal with a low-frequency linear wave; a sound energy projector driven by such modulated signal; a receiver mounted to receive sound energy emitted by said projector after reflection from an object; means for heterodyning the signal driving said projector with the output signal of said receiver; a plurality of filters, connected to said last-mentioned means, each sensitive to a relatively narrow band of frequencies for indicating the frequency of the heterodyned signals; an indicator device; and means for rapidly and successively applying the outputs of said filters to said indicator for effectively simultaneous portrayal on said indicator.

6. An echo-ranging system comprising transmitting means for propagating a linearly frequency-modulated signal in a given medium, means for receiving said signal after reflection from objects in said medium, heterodyning means associated with said receiving means for heterodyning said propagated signal with signals reflected by said objects, a plurality of narrow band filters respectively responsive to different bands of a group of adjacently located frequency bands coupled to the output of said heterodyning means, a plurality of distinct means, each coupled to the output of a separate one of said narrow band filters, for rectifying and storing the output derived from said band filters, and means for successively examining the output of said filters to determine the range of the said objects by the frequency indicated by said distinct storage means.

7. An echo-ranging system comprising means for generating a high-frequency electric signal, means for frequency modulating said signal in accordance with a low-frequency wave cyclically varying in frequency at a linear rate, a sound energy projector driven by said frequency modulated signal, a receiver mounted to receive sound energy emitted by said projector after reflection from an object, heterodyning means associated with said receiving means and said modulated signal for heterodyning said modulated signal and said received signal, a plurality of narrow-band filters respectively responsive to different bands of a group of adjacent frequency bands, said narrow-band filters being coupled to the output of said heterodyning means, a plurality of distinct rectifying and storing means each coupled to the output of a separate one of said narrow-band filters respectively, and means for successively examining the output of said filters to determine the range of the said objects by the frequency indicated by said distinct storage means.

8. An echo-ranging system comprising means for generating a high-frequency electric signal, means for frequency modulating said signal in accordance with a low-frequency wave cyclically varying in frequency at a linear rate, a sound energy projector driven by said modulated wave and propagating a linearly frequency-modulated signal in a given medium, means for receiving said propagated signal after reflection from objects in said medium, means for heterodyning the signal driving said projector with the output signal of said receiver, a slope amplifier connected in the output of said heterodyning means, a plurality of narrow-band filters respectively responsive to different bands of a group of adjacent frequency bands and coupled to the output of said slope amplifier, a plurality of distinct rectifying and storing means each of which is coupled to the output of a respective one of said narrow-band filters, electronic means for successively examining the output of said filters, and a cathode-ray oscilloscope connected to said electronic means for indicating the range of the said objects by the frequency indicated by said distinct storing means.

References Cited in the file of this patent

UNITED STATES PATENTS

| | | |
|---|---|---|
| 2,148,578 | Pullis | Feb. 28, 1939 |
| 2,159,790 | Freystedt et al. | May 23, 1939 |
| 2,206,903 | Lane et al. | July 9, 1940 |
| 2,236,893 | Chaffee | Apr. 1, 1941 |
| 2,248,215 | Budenbom | July 8, 1941 |
| 2,256,539 | Alford | Sept. 23, 1941 |
| 2,268,587 | Guanella | Jan. 6, 1942 |
| 2,268,643 | Crosby | Jan. 6, 1942 |
| 2,405,134 | Brown et al. | Aug. 6, 1946 |
| 2,418,490 | Turner | Apr. 8, 1947 |
| 2,536,770 | Rost | Jan. 2, 1951 |
| 2,536,771 | Rost | Jan. 2, 1951 |

FOREIGN PATENTS

| | | |
|---|---|---|
| 545,778 | Great Britain | June 12, 1942 |
| 546,202 | Great Britain | July 2, 1942 |